July 22, 1969
D. E. WRIGHT
3,456,354
LEVEL
Filed Nov. 21, 1967
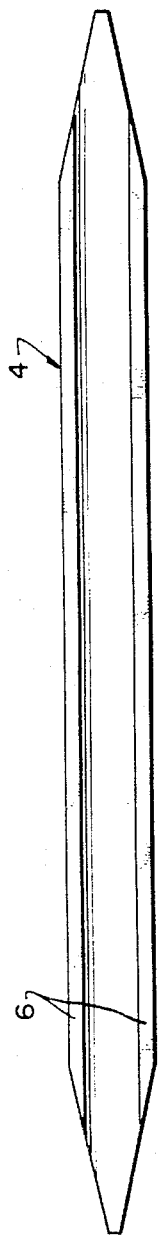
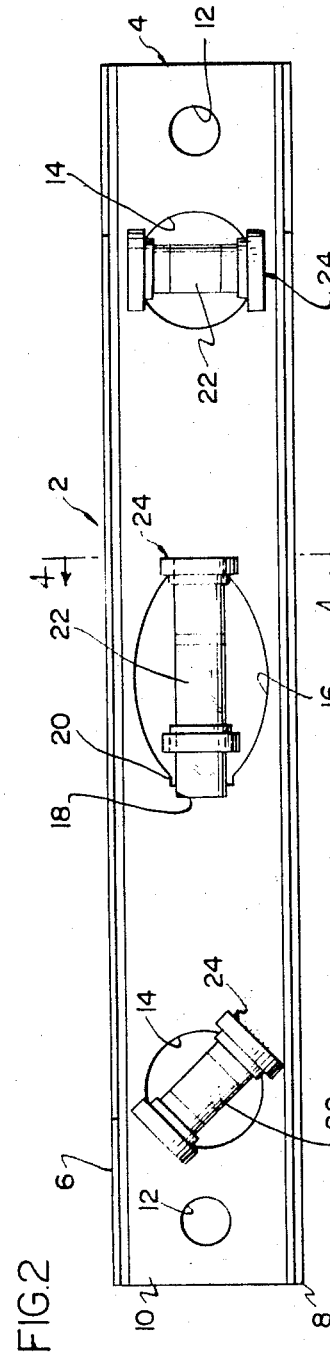
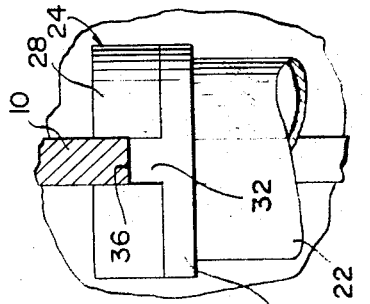
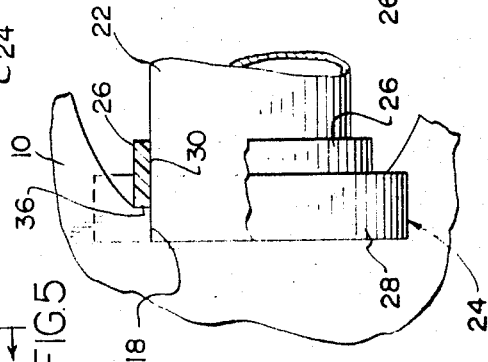
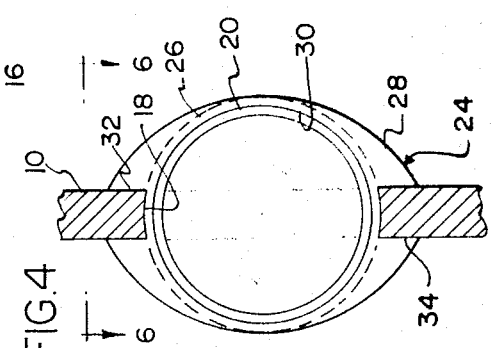
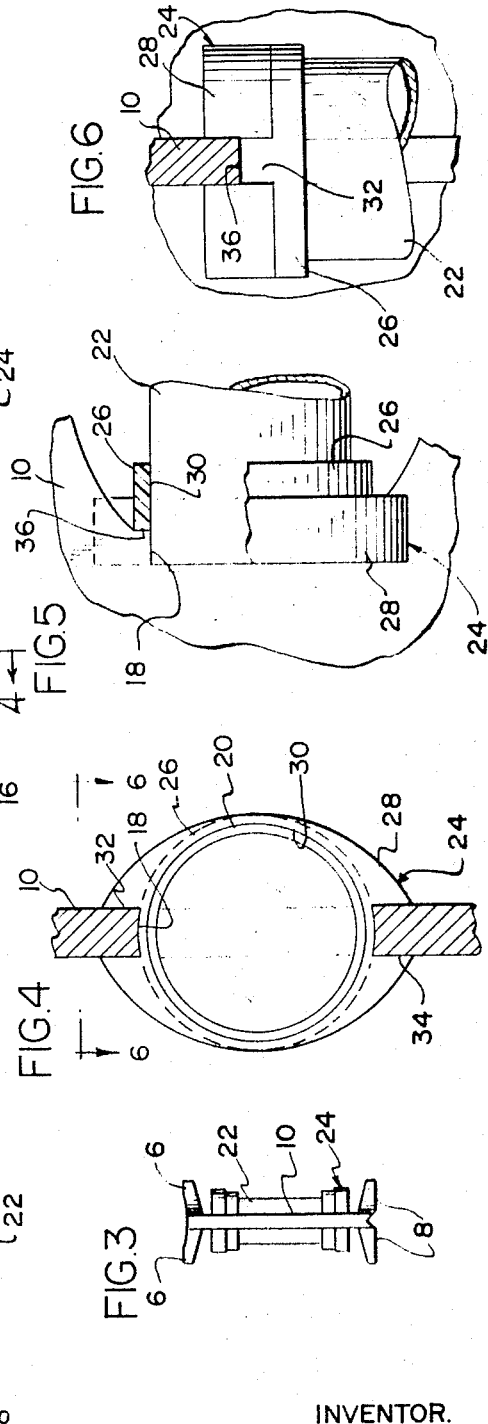
INVENTOR.
DONALD. E. WRIGHT
BY Petterbridge, O'Neil & Aubel.
ATTORNEYS.

United States Patent Office 3,456,354
Patented July 22, 1969

3,456,354
LEVEL
Donald E. Wright, Box 387, Elm Grove, Wis. 53213
Filed Nov. 21, 1967, Ser. No. 684,661
Int. Cl. G01c 9/26
U.S. Cl. 33—211                     6 Claims

ABSTRACT OF THE DISCLOSURE

A level instrument with sleeve means telescoping over bubble vials for aligning and positioning them on the web of the instrument. The vials are generally cylindrical with a barrel-shaped bore.

---

The level instrument of the invention is designed primarily for use in applications not requiring the common, elongated level instrument ordinarily used in most leveling situations. The subject level instrument can be made in a size and weight which will make it possible for its user to handle or carry the instrument in his pocket. This makes it possible for the user to make on-the-spot confirmations of particular angular relationships without necessitating carrying a full complement of tools, including a common elongated level, with him.

The subject pocket-sized level instrument utilizes a simple means for securing a level vial to the frame of the level instrument. In the preferred construction, a level vial and frame therefor, similar to that described in my Patent 3,311,990, which issued Apr. 4, 1967 for a "Level" should be employed. It is also preferred that the vial installation should be carried out in a manner similar to that taught in the above mentioned patent wherein a generally cylindrical vial provided with an essentially barrel-shaped bore is inserted at substantially right angles to the plane of the frame of the level instrument and in close fitting relationship with a preformed aperture in the frame designed to receive and accommodate the level vial therein.

In the past, it has not been possible to produce a pocket-sized level instrument or torpedo level having two opposed measuring surfaces. It was found in prior level constructions to be necessary to use curved level vials arranged in tandem groupings to permit angle measurements with more than one vial surface. In pocket-sized instruments, the utilizing of tandem vial groupings would have resulted in the production of a prohibitively large and cumbersome level instrument which would not have been a truly pocket-sized instrument, and a level instrument which would have been more expensive than could have been justified. However, by developing the level vial and installation method illustrated and described in my earlier Patent 3,311,990, it has now become possible to develop a pocket-sized level instrument which can be manufactured and sold at a reasonable price and which is of a size and weight truly permitting the level to be handily carried in a user's pocket.

In the subject modification of the level and vial installation described in my patent, a pair of securement members are telescoped over the outer surface of a vial prior to the installation of the vial on the frame. When the vial is inserted into a preformed aperture in the frame, the telescoped securement members on the vial surface are moved in opposite directions on the vial and into engagement with opposed frame walls bordering the level vial aperture. The securement members are designed to hold the vial in its proper position with respect to the plane of the frame. This can be done by the frictional engagement of the securement members with the frame portions bordering the vial or by applying a bonding agent between the frame and the securement members to bond them and thereby the vial to the frame. This means of securing a vial to the frame avoids the more expensive and more cumbersome cover plate installation used in connection with larger level instruments.

Various other objects and advantages of the invention will hereinafter become more fully apparent from the following description of the drawing illustrating presently preferred embodiments thereof and wherein:

FIG. 1 is a top plan view of a pocket-size level instrument of the invention;

FIG. 2 is a side elevation of a pocket-sized level instrument of the invention illustrating various vial angular relationships with respect to the working surfaces of the instruments;

FIG. 3 is an end view of the level instrument illustrated in FIG. 2;

FIG. 4 is an enlarged fragmentary cross-sectional view of the level instrument of FIG. 2 taken along lines 4—4 thereof and illustrating the relationship of the vial securement member and frame;

FIG. 5 is a partial side elevational view of a level instrument illustrating a securement member and vial attached to the frame of the instrument; and FIG. 6 is a top plan view of the vial installation illustrated in FIG. 4 taken along lines 6—6 thereof.

Referring to FIG. 2, a pocket level instrument or "torpedo" level, generally designated 2, is shown to be formed with a frame 4. For purposes of weight and size reduction, as well as manufacturing economy, the entire frame 4 is preferably fabricated from metal. And, in this instance, the preferred metal employed is an aluminum extrusion having a general I-shaped cross section as is shown in FIG. 3.

The frame of the pocket-sized level 2 is provided with top and bottom working surfaces, 6 and 8 respectively, as can be best seen in FIGS. 2 and 3. These working surfaces are precision machined to define parallel planes with respect to each other. The indented portions shown between the working surfaces 6 and 8 are present in the frame extrusion primarily to serve as alignment means when the frame is precision machined to produce parallel top and bottom working surfaces, 6 and 8 respectively. These working surfaces are aligned in generally normal relationship with respect to the vertical plane of interconnecting web 10 of the level frame. As is shown in FIG. 3, web section 10 is formed with a relatively uniform cross section throughout the length thereof and is disposed along its length in essentially normal relationship with respect to the precision machined top and bottom surfaces, 6 and 8 respectively.

FIGS. 1 and 2 illustrate the tapered end construction of the opposed ends of frame 4. This tapered end construction is designed primarily to reduce the bulk of the level instrument and to permit its insertion and withdrawal from a pocket without catching on any portions of the material thereof.

Referring again to FIG. 2, a number of openings 12, 14 and 16 are punched through the web 10 of frame 4 at preselected spaced intervals along the longitudinal axis thereof. As is shown, these openings may take a variety of shapes and serve to provide means for the alignment of the raw frame to permit the precision machining thereof, as is the case with the small round openings 12; to serve as vial openings or receptacles, as is the case with large round openings 14 and large oval openings 16; and to lighten the frame, facilitate manipulation of the level instrument and storage thereof, as is the case with each of the openings 12, 14 and 16.

As is best shown in FIGS. 2 and 5, the vial openings or receptacles 14 and 16 are each formed with a pair of opposed notches 18. The notches 18 have the appearance in side elevation, as shown in both FIGURES 2 and 5, of open ended rectangles. The opening 16 of the level instrument 2 illustrated in FIG. 2 is shown to be formed with a second stepped recess 20 spaced radially inwardly from vial notch 18 to facilitate anchoring of a securement member thereto.

In the precision production of level frames, the notched openings 18 provided therein are generally formed by a broaching technique. The peripheral surfaces defining these notches are ordinarily formed in a manner such that they are made to lie at substantially right angles to the vertical plane of level frame web 10. However, regardless of the method selected for producing the vial receiving notches 18, the dimensions of these notches and the distance which they are spaced apart must be maintained with relatively close tolerances and therefore require a precise machining operation. This is necessary primarily to produce the close or precision fit required between the frame and vial in manufacturing the level instrument of the invention.

Generally speaking, the notches 18 which are formed are as parts of openings 14 and 16 in web 10 of the level frame with pairs thereof in each of the openings being positioned to receive and align the longitudinal axis of a level vial, generally designated 22, in a predetermined angular relationship with the working surfaces 6 and 8 of the level frame. As shown in FIG. 2, one vial 22 is positioned to maintain the longitudinal axis thereof in normal relationship to working surfaces 6 and 8 (shown on the right hand side of the level web), another is aligned at a 45° angle to the working surfaces (shown on the left hand side of the level), and finally, one is positioned in parallel relationship to the working surfaces (shown in the center of the web).

Angular relationships other than the level, a plumb and the 45° angle shown on the level instrument illustrated in FIG. 2, may be produced where required. The level vials 22 may be fabricated in the manner set forth in my above mentioned patent or in any other convenient process utilizing whatever material appears best suited for the instrument. It is preferred, however, that at least the opposed end portions of the level vial 22 are formed with a configuration such that the vials may be moved at essentially a right angle to the vertical plane of web 10 of the frame and in generally parallel alignment with the peripheral surfaces defining notches 18 in a manner such that the vial is brought into relatively precise frictional close-fitting engagement with the peripheral surfaces defining the notches 18 formed in the web 10. If the vial peripheries adjacent the ends thereof are formed in a pre-selected shape, and preferably in concentric alignment with the longitudinal axis of the vial, the installation of the vial on the frame will serve to automatically align the gauging portion of the vial in the desired predetermined relationship with respect to the working surfaces 6 and 8 of the level frame.

Therefore, utilizing a barrel-shaped vial of the type discussed in the above cited patent, it is now possible to produce a pocket-sized level instrument which can be used in gauging level, plumb and other angular surfaces. The frame 4 can be made of a light-weight material such as aluminum utilizing only three vials, as illustrated in FIG. 2. This pocket-sized level can be used to gauge from three separate working surfaces while six vials and a high bulky frame would have been previously required.

The preferred level vial construction is a cylindrical tube having a barrel-shaped bore. Therefore, the level vial 22 is illustrated in FIGS. 2 through 6 as comprising a cylinder over which a pair of securement members 24 are telescoped. However, other vial external configurations over which securement members can be telescoped by accommodating the configurations thereof to the external vial configurations are considered to be within the scope of the invention.

The securement members 24 are telescoped over the level vials 22 and are positioned at a point along the axis thereof spaced from the ends of the vial 22 prior to assembly of the vial to the frame. As is shown in the central oblong opening 16 of the level instrument illustrated in FIG. 2, the level vial 22, carrying securement members 24, is positioned within the opening 16 and in frictional engagement with the peripheral surfaces defining vial notches 18 in the manner discussed above. After the vial has been installed in an opening such as 14 or 16, the securement members 24 are moved in opposite directions and axially outwardly with respect to the mid-point of the level vial 22. The members are moved in these respective directions until they have been brought into frictional engagement with peripheral portions of web 10 bordering the vial notches 18.

Specifically, each of the securement members 24 is formed from a plastic material, such as polyvinyl chloride. As can be best seen in FIGS. 4 and 5, each of the securement members is formed with a basic cylindrical section 26. An integral oval flanged portion 28 of greater cross-section than cylindrical section 26 extends from near the mid-point of the cylindrical section and forwardly beyond the end thereof as can be best seen in FIG. 4. Each of the securement members is provided with an axially extending passage 30 which is formed with substantially the same diameter as that of the O.D. of the cylindrical level vial 22, but with sufficient tolerances provided therebetween to permit the securement member to be telescopically moved with respect to vial 22.

FIGS. 4, 5 and 6 show that the top and bottom ends of oval flange portion 28 are formed with apertures 32 and 34, respectively. These apertures extend the axial length of each of the oval flange portions 28 above the cylindrical section 26 and stop at end 36 of section 26, best seen in FIGS. 5 and 6, at the level thereof to form a step structure with section 26. The apertures 32 and 34 each have a cross-section closely approximately the width of web 10 of the level frame 4. Again, the dimensional differences are only those sufficient to permit the walls bordering top and bottom notches 32 and 34 to be moved into frictional engagement with the side walls of level frame web 10 as is shown in FIGS. 4, 5 and 6. The step structure of each of the members 24 formed by a flange portion 28 and aperture thereof, section 26 and end 36 thereof, is designed for abutting engagement with the web portions bordering notches 18, as shown in FIG. 5 or for frictional engagement with stepped recess 20 bordering the notches 18, as shown in the central web portion of FIG. 2, to provide a more positive lock between the member 24 and the web 10.

After each of the securement member pairs have been moved into web engaging relationship, as shown in the level instrument illustrated in FIG. 2, the level vials 22 are maintained in their predetermined relationships with respect to the top and bottom working surfaces 6 and 8, respectively, and are protected thereby from accidental dislodgment.

While the securement members 24 may be disposed in frictional engagement with the web 10 of the level frame to maintain the predetermined position of the vial 22 with respect to the frame working surfaces, it is preferred that a bonding agent, such as an epoxy resin, be applied between the securement members 24 and adjacent surfaces of web 10 to provide for the essentially permanent securement of the level vials 22 in predetermined position on the web 10 of level frame 4.

Various modes of carrying out the invention are contemplated as being within the scope of the subject matter which is regarded as the invention.

I claim:

1. A level instrument for measuring a plurality of angular relationships comprising a web, the web being provided with an aperture, the aperture being adapted for receipt of a level vial, the vial receiving aperture being provided with bordering walls defining at least a pair of opposed slot portions for receipt of vial ends therein, a level vial disposed in concentric relation with the longitudinal axis of the web thereof, the outer surface of the vial having at least a portion thereof in a predetermined registry with respect to the longitudinal axis of the vial, the outer surface of the vial being positioned in close fitting contact with the walls defining the opposed slot portions of the web aperture without special calibration thereof, sleeve means telescoped over the vial outer surface, said sleeve means having a securing means for maintaining the position of the vials with respect to the walls of the web without angular adjustment of the vial with respect to the web, a first working surface on the web and extending therefrom at a predetermined angle, and a second working surface on the web and extending therefrom at a predetermined angle whereby the angular disposition of a particular surface may be accurately gauged utilizing a pocket-sized level.

2. The level instrument of claim 1 wherein the first and second working surfaces are disposed in generally parallel alignment and extend from the working surface generally normal thereto, and the opposed portions of the first and second working surfaces adjacent the opposed web extremities are tapered to substantially the cross-sectional dimension of the web.

3. The level instrument of claim 1 wherein said sleeve means are telescoped over the outer vial periphery and are slidably disposed with respect to the longitudinal axis of the vial, the sleeve means serving to secure the vial to the web after the vial has been positioned in close fitting contact with the walls defining the opposed slot portions of the web aperture.

4. The level instrument of claim 3, wherein the sleeve means has a cylindrical bore of a diameter sufficient to permit the telescoping of the sleeve means over an end of a vial and the longitudinal sliding movement of the sleeve means with respect to the vial, the sleeve means having means thereon for engaging the wall of the web bordering an aperture thereof to maintain the predetermined position of the vial in relation to the web and to prevent the accidental dislodgment of the vial therefrom.

5. The level instrument of claim 4 wherein said sleeve means comprises a pair of members which are telescoped over the vial before the vial is placed in close fitting contact with the walls defining the opposed slot portions of a web aperture, and the members are moved axially of the vial body to opposite ends thereof and into engagement with opposed walls of the aperture containing the vial to maintain the predetermined position of the vial with respect to the web of the instrument.

6. The level instrument of claim 5 wherein the members are bonded to the web to provide a permanent securement thereof.

References Cited

UNITED STATES PATENTS

| | | | |
|---|---|---|---|
| 1,225,132 | 5/1917 | Johnson | 33—207 |
| 3,311,990 | 4/1967 | Wright | 33—211 |

OTHER REFERENCES

"Shopping For Tools," Popular Mechanics 98(5): p. 225, November 1952.

LEONARD FORMAN, Primary Examiner

DENNIS A. DEARING, Assistant Examiner

U.S. Cl. X.R.

287—20